April 21, 1964 R. C. OELER ETAL 3,130,381

SHIELD FOR INDUCTANCE COILS

Filed Oct. 6, 1961

INVENTORS
Richard C. Oeler
BY Edward A. Salners
Mueller & Aichele
Attys.

United States Patent Office 3,130,381
Patented Apr. 21, 1964

3,130,381

SHIELD FOR INDUCTANCE COILS

Richard C. Oeler, Elmhurst, and Edward A. Salners, Mount Prospect, Ill., assignors to Motorola, Inc., Chicago, Ill., a corporation of Illinois Filed Oct. 6, 1961, Ser. No. 143,428
2 Claims. (Cl. 336—84)

This invention relates to inductance coil devices and more particularly to a shielded coil assembly which permits rapid and firm mounting of the coil.

It is common to provide inductance coils with metal shields to isolate them from interference by other components which may be proximate to the coils in the particular circuit. It is an advantage if the shields are capable of being fastened securely to the chassis on which they are mounted to establish good grounding, and further provide support means for the coil or coils which they shield. In the past, ground connection has often been improved by soldering the shield to the chassis, which consumes considerable assembly time. To insure that electrical changes will not result from shifting of the coil inside the shield, it has been necessary to secure the coil to the chassis or shield by such means as welding, riveting, bolting, etc. All such operations have taken considerable time and materials.

Accordingly, it is an object of this invention to provide a shield, for an inductance coil or coils, which is capable of rapid and easy mounting to a chassis while still insuring adequate ground connection.

A further object of the invention is to provide a shield in and to which an inductance coil or coils may be securely mounted with great facility.

A further object of the invention is to provide an inductance coil and shield usable in a fast, low cost method of fabrication.

A feature of the invention is the provision, on a coil shield, of a peripheral shoulder formed near one end, which end is capable of being flanged to wedge a chassis plate against the shoulder for mounting.

Another feature of the invention is the provision of a coil shield having locking grooves in the side thereof, and an inductance coil having locking fingers for expedient engagement with the grooves for mounting of the coil in the shield.

A further feature of the invention is a method of assembling an inductance coil and shield assembly to a chassis plate, in which the shield is fixed to the plate by flanging one of its ends over to secure the plate against a shoulder of the shield, and by wedge-mounting the coil within the shield.

Briefly the invention consists of a coil shield having one end partially closed by a top. The other end of the shield is open and has means provided thereon for mounting the shield to a chassis plate. Two longitudinal grooves substantially parallel to the axis of the shield are located at its sides, each groove having a clip or locking area formed therein. The shield is mounted open end first over a corresponding hole in a chassis plate.

A coil, such as the windings of an intermediate frequency transformer, is then inserted through the opening in the chassis plate and into the shield so that the end of the coil form is fitted into an aperture in the conical end of the shield. Fingers in the base of the coil form are clipped into the locking areas in the longitudinal grooves.

Figure 1:
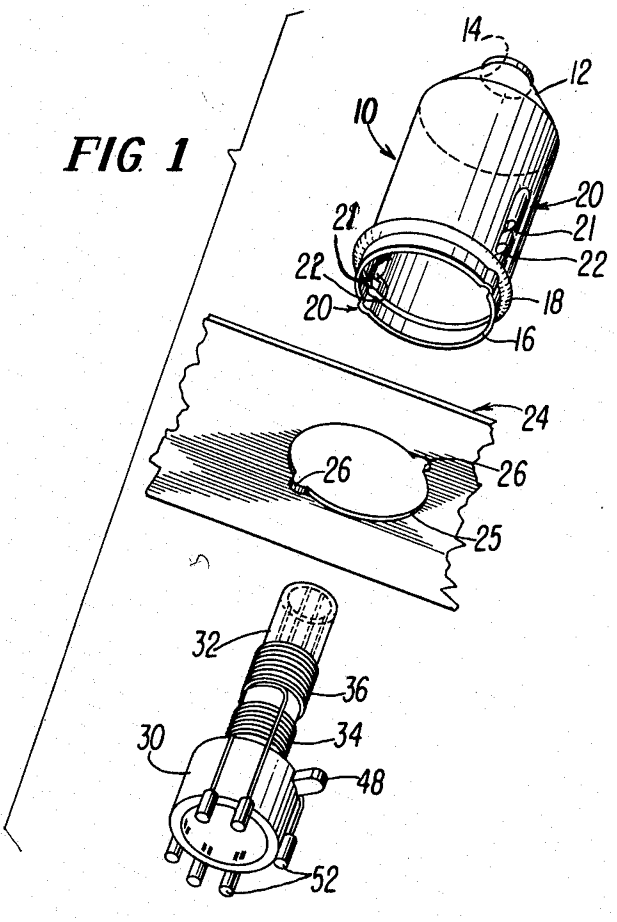
FIG. 1 is an exploded view of the coil and shield of the invention.

Referring to FIG. 1, coil shield 10 is substantially cylindrical in form. Shield 10 has a closing portion 12, in the shape of a truncated cone, at one end with an opening 14 therein. The opposite end 16 of shield 10 remains fully open. Shoulder 18 surrounds the periphery of shield 10 a short distance from open end 16. Position grooves 20 extend from open end 16 in an axial direction along the opposite sides of shield 10. These grooves have stops 21 and ridges 22 formed therein to capture locking extensions of the transformer as will be explained at a later point. (See FIG. 3.)

FIG. 1 shows also a chassis plate 24 which may be part of the television or radio receiver or other similar apparatus. Chassis plate 24 has a hole 25 formed therein to receive open end 16 of shield 10. Hole 25 has guide slots 26 formed therein to mate with grooves 20.

Figure 2:
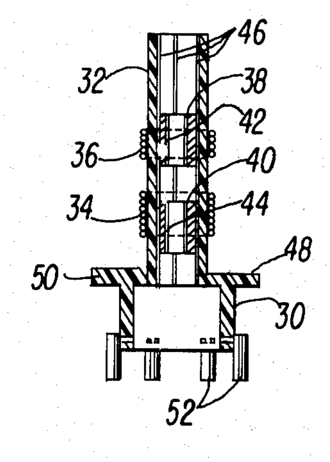
FIG. 2 is a section of the coil of the invention.

The drawings depict the inductance coil in the form of an intermediate frequency transformer, the construction of which is best shown in FIGS. 1 and 2. Hollow cylinder 30 has a tubular coil form 32 extending therefrom on a common axis. Transformer coils 34 and 36 are wound on coil form 32 and are tunable by self-tapping plugs 38 and 40. Slugs 38 and 40 have hexagonal openings 42 and 44 therein to permit adjustment by means of an Allen wrench. Tubular coil form 32 is provided with ribs 46 running the full length of its interior surface. Ribs 46 provide a support for slugs 38 and 40 through cold flow into threads on the slugs. Projections or fingers 48 and 50 extend from either side of the juncture between hollow cylinder 30 and coil form 32. Conductor lugs 52 are fastened about cylinder 30 to provide means for interconnecting various circuit components including coils 34 and 36. Fingers 48 and 50 may be of different sizes as shown to facilitate identification of each of lugs 52.

Figure 3:
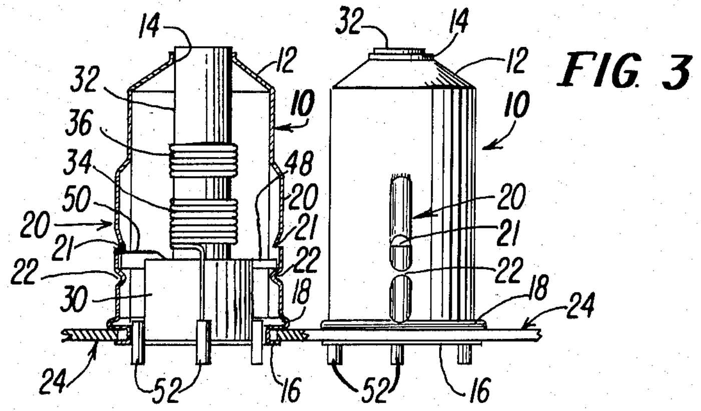
FIG. 3 is a partially sectioned view of two assembled coils and shields.

FIG. 3 shows two views of the device in assembled form. The open end of shield 10 is inserted through hole 25 in chassis plate 24 with positioning grooves 20 mating with guide slots 26. Shoulder 18 will abut chassis plate 24 with part of open end 16 extending beyond the opposite surface of chassis plate 24. This extending portion of open end 16 is crimped or mashed against chassis plate 24, usually by machine on several shields at a time, to securely wedge the plate between end 16 and shoulder 18. A sound mechanical and electrical connection between shield 10 and chassis plate 24 results.

The transformer is placed inside shield 10 by insertion, coil form 32 first, through open end 16 and hole 25. Fingers 48 and 50 slide along positioning grooves 20 until they are firmly secured between ridges 22 and stops 21. The ridges 22 provide for a snap fit, that is, the fingers will ride over the ridges and snap into position between the ridges and stops 21. The spacing between ridges 22 and stops 21 will determine the degree of retention, while the height of ridges 22 will determine the amount of effort required to insert. Rigid retention of the coil form 32 is actually obtained only from the thicker arm 50, whereas thinner arm 48 serves for differentiating position in the automated manufacture of the assembly. When the transformer has been inserted sufficiently into shield 10 to cause securing of fingers 48 and 50, coil form 32 will protrude slightly through opening 14 thereby supporting the transformer at three areas. The distance which coil form 32 protrudes through opening 14 is not critical, thereby easing the tolerance requirements for stops 21 and coil form 32.

The result of such an arrangement is a transformer assembly which may be rapidly put together, and wherein adequate mechanical and electrical connection exists between the transformer shield and the chassis upon which it is mounted, and in which the transformer may be securely mounted within the shield subsequent to mounting the shield on the chassis plate.

We claim:

1. A shielded coil assembly including in combination, a tubular shield having a first end and a fully open second end and a peripheral shoulder formed near said second end, said shield being fixed within a chassis opening by engaging the chassis between said shoulder and a flanged end of said shield, straight locking grooves extending axially on opposite sides of the interior surface of said shield, each of said grooves having a stop toward the upper end thereof and a ridge toward the lower end thereof, an inductance coil having a coil form portion and locking extensions thereon to engage said grooves, said coil being mounted in said shield and secured therein by retention of said locking extensions between said stops and said ridges, and means at said first end of said shield engaging said coil form to provide further support therefor.

2. A shielded coil assembly, including in combination a chassis plate having an opening which opening contains guide slots on the edges thereof, a tubular shield having a conical section thereon partially closing a first end to leave an opening centrally thereof, said shield further having a fully open second end and a peripheral shoulder formed near said second end, and having axially extending, straight locking grooves disposed on opposite sides of the interior surface thereof, each of said grooves having a stop toward the upper end thereof and a ridge toward the lower end thereof, said shield being fixed to said plate in said opening therein so that said locking grooves mate with said guide slots and so that said plate is secured between said shoulder and a flanged end of said shield, an inductance coil having a coil form portion and locking fingers on opposite sides of an end thereof to mate with said grooves, said coil being mounted in said shield and secured therein by engagement of said coil form portion with said opening in said first end of said shield and by engagement of said locking fingers with said locking grooves between said stops and said ridges.

References Cited in the file of this patent

UNITED STATES PATENTS

| | | |
|---|---|---|
| 807,051 | Strong | Dec. 12, 1909 |
| 2,483,801 | Becwar | Oct. 4, 1949 |
| 2,875,423 | Ritter | Feb. 24, 1959 |
| 2,970,209 | Glowzinski | Jan. 31, 1961 |

FOREIGN PATENTS

| | | |
|---|---|---|
| 627,641 | Great Britain | Aug. 12, 1949 |